US012563451B2

(12) United States Patent
Ezrielev et al.

(10) Patent No.: US 12,563,451 B2
(45) Date of Patent: Feb. 24, 2026

(54) SYSTEM AND METHOD FOR MANAGING METHODS OF COMMUNICATION BETWEEN DATA PROCESSING SYSTEMS USING A DIGITAL TWIN

(71) Applicant: Dell Products L.P., Round Rock, TX (US)

(72) Inventors: Ofir Ezrielev, Be'er Sheva (IL); Tomer Kushnir, Omer (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 477 days.

(21) Appl. No.: 18/309,242

(22) Filed: Apr. 28, 2023

(65) Prior Publication Data

US 2024/0365174 A1　Oct. 31, 2024

(51) Int. Cl.
*H04W 28/24* (2009.01)
*H04B 17/309* (2015.01)
(Continued)

(52) U.S. Cl.
CPC .......... *H04W 28/24* (2013.01); *H04B 17/309* (2015.01); *H04B 17/391* (2015.01); *H04W 24/10* (2013.01)

(58) Field of Classification Search
CPC .... H04W 28/24; H04W 24/10; H04B 17/309; H04B 17/391
See application file for complete search history.

(56) References Cited

U.S. PATENT DOCUMENTS 6,742,128 B1　5/2004　Joiner
7,159,210 B2　1/2007　Griffin
(Continued)

FOREIGN PATENT DOCUMENTS

WO　2022101656 A1　5/2022

OTHER PUBLICATIONS

Esteban, Jonathan, "Simulating Network Lateral Movements through the CyberBattleSim Web Platform", Diss. Massachusetts Institute of Technology, 2022, pp. 1-66 (66 pages).
(Continued)

*Primary Examiner* — Natasha W Cosme
(74) *Attorney, Agent, or Firm* — WOMBLE BOND DICKINSON (US) LLP

(57) ABSTRACT

Methods and systems for managing methods of communication used by data processing systems throughout a distributed environment are disclosed. To manage methods of communication, a system may include a communication manager and one or more data processing systems. The communication manager may monitor use of an existing method of communication by a data processing system over time. If characteristics of the existing method of communication do not meet criteria specified by a communication requirement, the communication manager may determine whether to update the existing method of communication. To do so, the communication manager may host and operate a digital twin of the data processing system and may simulate operation of the data processing system using other methods of communication using the digital twin. If one of the other methods of communication has characteristics that meet the communication requirement, the communication manager may update the existing method of communication.

20 Claims, 4 Drawing Sheets

(51) Int. Cl.
        H04B 17/391            (2015.01)
        H04W 24/10             (2009.01)

(56)                  References Cited

U.S. PATENT DOCUMENTS

| | | | |
|---|---|---|---|
| 7,480,827 B2 | 1/2009 | Callaway | |
| 7,725,764 B2 | 5/2010 | Morosan | |
| 7,908,653 B2 | 3/2011 | Brickell | |
| 8,060,442 B1 | 11/2011 | Hechat | |
| 8,368,915 B1 | 2/2013 | Feeser | |
| 8,516,596 B2 | 8/2013 | Sandoval | |
| 10,325,102 B2 | 6/2019 | AthuluruTlrumala | |
| 10,540,960 B1 | 1/2020 | Jones | |
| 11,184,401 B2 | 11/2021 | Crabtree | |
| 11,334,471 B1 | 5/2022 | Stocker | |
| 11,733,908 B2 | 8/2023 | Sun | |
| 11,750,657 B2 | 9/2023 | Hader | |
| 12,299,430 B2 | 5/2025 | Cardozo | |
| 2005/0010819 A1* | 1/2005 | Williams | H04L 41/0853 |
| | | | 726/4 |
| 2008/0016339 A1 | 1/2008 | Shukla | |
| 2008/0282345 A1 | 11/2008 | Beals | |
| 2009/0106255 A1 | 4/2009 | Lacapra | |
| 2010/0031308 A1 | 2/2010 | Khalid | |
| 2013/0152047 A1 | 6/2013 | Moorthi | |
| 2015/0026767 A1 | 1/2015 | Sweet | |
| 2015/0046125 A1 | 2/2015 | Jagiella | |
| 2015/0089502 A1 | 3/2015 | Horovitz | |
| 2016/0308895 A1 | 10/2016 | Kotler | |
| 2017/0041317 A1 | 2/2017 | Kurian | |
| 2017/0041322 A1 | 2/2017 | Kurian | |
| 2017/0060607 A1 | 3/2017 | Hollinger | |
| 2017/0060975 A1 | 3/2017 | Akyureklier | |
| 2017/0214701 A1 | 7/2017 | Hasan | |
| 2019/0034636 A1 | 1/2019 | Gopinath | |
| 2019/0173919 A1 | 6/2019 | Irimie | |
| 2019/0196952 A1 | 6/2019 | Manchiraju | |
| 2019/0213104 A1 | 7/2019 | Qadri | |
| 2019/0349426 A1 | 11/2019 | Smith | |
| 2020/0048866 A1 | 2/2020 | Weber | |
| 2020/0081445 A1 | 3/2020 | Stetson | |
| 2020/0092322 A1 | 3/2020 | Boss | |
| 2020/0250295 A1 | 8/2020 | Padmanabhan | |
| 2020/0411168 A1 | 12/2020 | Thomas | |
| 2021/0097186 A1 | 4/2021 | Mandal | |
| 2021/0168175 A1 | 6/2021 | Crabtree | |
| 2021/0211438 A1 | 7/2021 | Trim | |
| 2021/0248229 A1 | 8/2021 | Kras | |
| 2021/0374032 A1 | 12/2021 | Rakshit | |
| 2022/0114310 A1 | 4/2022 | Berti | |
| 2022/0137611 A1 | 5/2022 | Naito | |
| 2022/0210200 A1 | 6/2022 | Crabtree | |
| 2022/0253534 A1 | 8/2022 | Biswas | |
| 2022/0299988 A1 | 9/2022 | Nair | |
| 2022/0327476 A1 | 10/2022 | Shanmugavelayudam | |
| 2023/0077780 A1 | 3/2023 | Decrop | |
| 2023/0082761 A1 | 3/2023 | Ruan | |
| 2023/0117225 A1* | 4/2023 | Porto Guedes | G06Q 10/0633 |
| | | | 705/7.27 |
| 2023/0367911 A1 | 11/2023 | Balber | |
| 2023/0376236 A1 | 11/2023 | Langer | |
| 2024/0003242 A1 | 1/2024 | Ambade | |
| 2024/0077867 A1 | 3/2024 | Mene | |
| 2024/0089284 A1 | 3/2024 | Rieger | |
| 2024/0169050 A1 | 5/2024 | Gehtman | |
| 2024/0177067 A1 | 5/2024 | Ezrielev | |
| 2024/0273411 A1 | 8/2024 | Mueck | |
| 2024/0348664 A1 | 10/2024 | Mohanram | |
| 2024/0354657 A1 | 10/2024 | Li | |
| 2024/0362145 A1 | 10/2024 | Ezrielev | |
| 2024/0364534 A1 | 10/2024 | Ezrielev | |
| 2025/0007945 A1 | 1/2025 | Rieger | |
| 2025/0039236 A1 | 1/2025 | Ignatius | |
| 2025/0133017 A1 | 4/2025 | Langer | |

OTHER PUBLICATIONS

Juan R. Trocoso-Pastoriza et al., "Orchestrating Collaborative Cybersecurity: A Secure Framework for Distributed Privacy-Preserving Threat Intelligence Sharing", arXiv:2209.02676v1, Sep. 6, 2022, retrieved from "arXiv preprint arXiv:2209.02676", pp. 1-31 (31 pages).

Thomas Kunz et al., "A Multiagent CyberBattleSim for RL Cyber Operation Agents", 2022 International Conference on Computational Science and Computational Interllogence (SCCI), Las Vegas, NV, USA, 2022, pp. 897-903 (7 pages).

Viadislav D. Veksler et al., "Simulations in Cyber-Security: A Review of Cognitive Modeling of Network Attackers, Defenders, and Users", Frontiers in Psychology, vol. 9, No. 691, May 15, 2018, pp. 1-12 (12 pages).

Igor Kotenko et al., "Agent-based modeling and simulation of botnets and botnet defense", Conference on Cyber Conflict, CCD COE Publications, Tallonn, Estonia, 2010, pp. 21-44 (24 pages).

Alcaraz, Cristina, and Javier Lopez. "Digital twin: A comprehensive survey of security threats." IEEE Communications Surveys & Tutorials 24.3 (2022): 1475-1503.

Masi, Massimiliano, et al. "Securing critical infrastructures with a cybersecurity digital twin." Software and Systems Modeling 22.2 (2023): 689-707.

Almasan, Paul, et al. "Digital twin network: Opportunities and challenges." arXiv preprint arXiv:2201.01144 (2022). (7 Pages).

Hu, Weifei, et al. "Digital twin: A state-of-the-art review of its enabling technologies, applications and challenges." Journal of Intelligent Manufacturing and Special Equipment 2.1 (2021): 1-34. (34 Pages).

Khan, Latif U., et al. "Digital-twin-enabled 6G: Vision, architectural trends, and future directions." IEEE Communications Magazine 60.1 (2022): 74-80. (7 Pages).

Nguyen, Huan X., et al. "Digital twin for 5G and beyond." IEEE Communications Magazine 59.2 (2021): 10-15. (13 Pages).

Wang, Danshi, et al. "The role of digital twin in optical communication: fault management, hardware configuration, and transmission simulation." IEEE Communications Magazine 59.1 (2021): 133-139. (6 Pages).

Pang, Toh Yen, et al. "Developing a digital twin and digital thread framework for an 'Industry 4.0'Shipyard." Applied Sciences 11.3 (2021): 1097. (22 Pages).

Isto, Pekka, et al. "5G based machine remote operation development utilizing digital twin." Open Engineering 10.1 (2020): 265-272. (8 Pages).

Rovira-Sugranes, Arnau, et al. "A review of AI-enabled routing protocols for UAV networks: Trends, challenges, and future outlook." Ad Hoc Networks 130 (2022): 102790. (30 Pages).

* cited by examiner

SYSTEM AND METHOD FOR MANAGING METHODS OF COMMUNICATION BETWEEN DATA PROCESSING SYSTEMS USING A DIGITAL TWIN

FIELD

Embodiments disclosed herein relate generally to managing methods of communication utilized by data processing systems throughout a distributed environment. More particularly, embodiments disclosed herein relate to systems and methods for identifying potential updates to methods of communication used by data processing systems over time.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
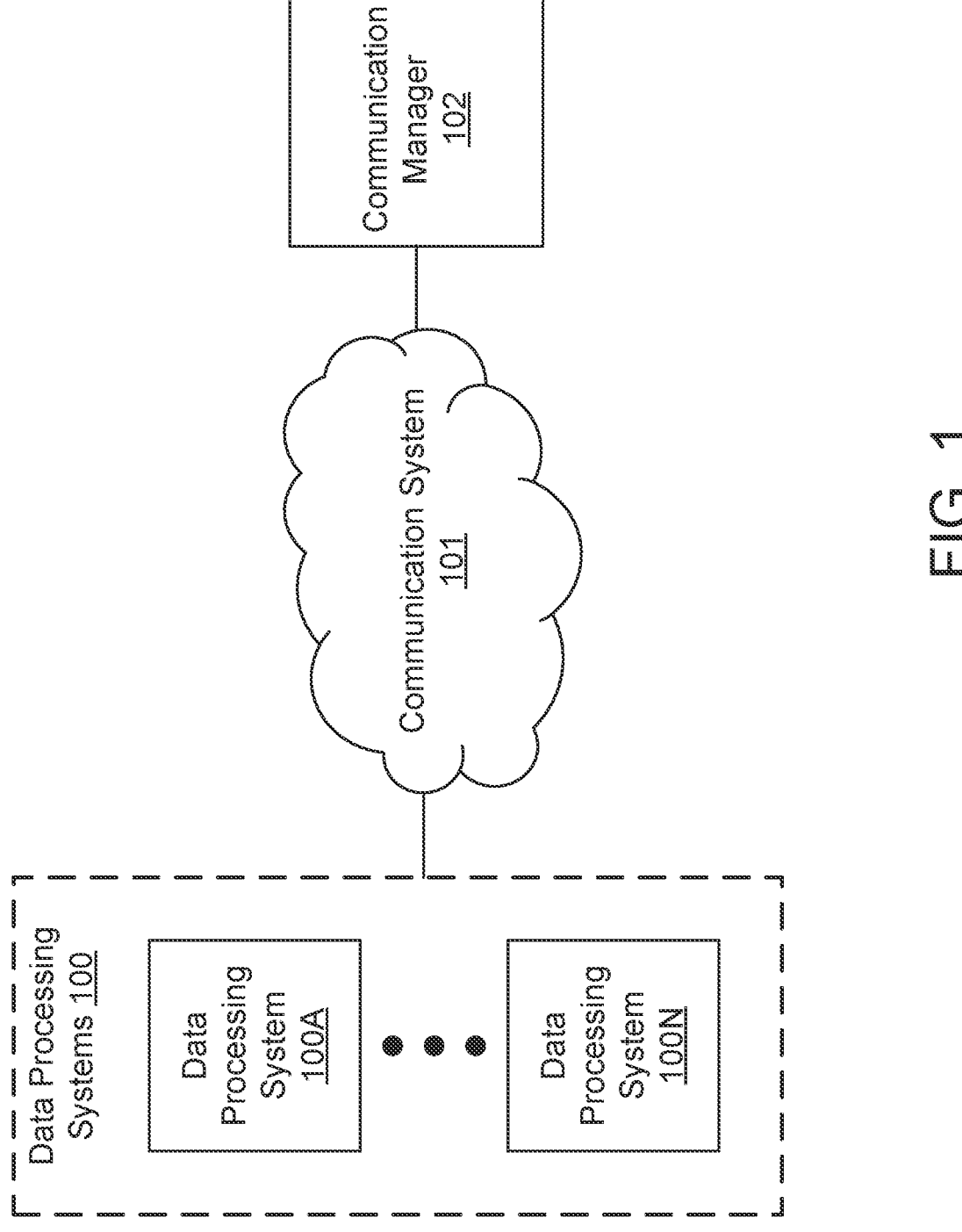
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing methods of communication used by data processing systems throughout a distributed environment. To manage the methods of communication, the system may include a communication manager. The communication manager may, for example, monitor use of an existing method of communication by a data processing system. The performance of the existing method of communication may depend on certain characteristics (e.g., a rate of data transmission, a rate of energy consumption during use, reliability of data transmissions, scalability, range of data transmissions, latency, etc.) of the method of communication.

Each method of communication may present a tradeoff between various characteristics. For example, a system may not require a high rate of data transmission and, therefore, a communication method may be selected that has the following characteristics: (i) low energy consumption and (ii) low rate of data transmission. By doing so, energy consumption may be reduced while meeting the data transmission needs of the system.

However, use of the existing method of communication by the data processing system may change over time (e.g., due to, for example, an event occurring resulting in a need to transmit data at an increased rate and/or other changes). A change in the use of the method of communication may result in a change to the requirements of the system and, therefore, the existing method of communication may or may not continue to meet the requirements of the system.

To continue to meet the needs of the system, the communication manager may monitor the use of the existing method of communication and may identify any changes that occur in the use. Upon identifying a change in the use, the communication manager may simulate operation of the data processing system using a digital twin. The digital twin may be capable of simulating the operation of the data processing system using different methods of communication.

Each method of communication may be associated with different characteristics. Therefore, following the change in the use, another method of communication may be more suitable (e.g., a communication method may, for example, allow for higher rates of data transmission but may consume more energy and/or communication system bandwidth during operation). By simulating operation of the data processing system using different methods of communication, the communication manager may determine whether a potential update to the existing method of communication may bring the existing method of communication into compliance with the needs of the system.

If the potential update to the existing communication method will bring the existing communication method into compliance with the needs of the system, the communication manager may initiate re-allocation of a communication channel associated with the data processing system. Thus, communication channels usable by the data processing system may be modified as needed over time to meet evolving data transmission needs (and/or other needs) of the system. By doing so, delays and/or other interruptions to computer-implemented services facilitated by the data processing systems may be reduced.

In an embodiment, a method of managing communications between data processing systems throughout a distributed environment by a communication manager is provided. The method may include: identifying a change in use of an existing method of communication by a data processing system of the data processing systems; obtaining communication system performance data for the data processing system in response to the change in the use, the communication system performance data comprising characteristics of the existing method of communication; making a determination, based on the communication system performance data and the change in the use, regarding whether future use of the existing method of communication will meet a communication requirement for the data processing system; in an instance of the determination in which the future use of the existing method of communication does not meet the communication requirement: identifying a remedial action set using a digital twin of the data processing system to identify a potential update to the existing method of communication, the potential update being intended to bring the existing method of communication into compliance with the communication requirement; and initiating performance of the remedial action set.

The characteristics of the existing method of communication may include at least one selected from a list consisting of: a quantification of energy consumption by the data processing system; a rate of data transmission; a quantification of reliability of data transmission; a quantification of latency of data transmission; and a range of data transmission.

The communication requirement may include a criterion for a characteristic of the characteristics of the existing method of communication that delineates whether the communication requirement is met.

Identifying the remedial action set may include: obtaining simulated communication system performance data generated by the digital twin for the potential update; comparing the simulated communication system performance data to the criteria to identify whether the potential update is likely to bring the existing method of communication into compliance with the communication requirement; and in an instance of the comparing where the potential update is likely to bring the existing method of communication into compliance with the communication requirement: identifying the potential update for implementation.

Identifying the remedial action set may also include: sequentially evaluating other potential updates using the digital twin until the criteria is met.

Initiating performance of the remedial action set may include: reallocating, based on the potential update, a first communication channel to support the change in the use; and reallocating, based on the potential update, a second communication channel that does not support the change in the use.

The change in the use may be a higher reporting rate due to a data drift in measurement samples by a sensor, the higher reporting rate requiring a higher communication bandwidth for the existing method of communication.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include monitoring services (e.g., of locations), communication services, and/or any other type of computer-implemented services.

To provide the computer-implemented services, the system may include communication manager 102. Communication manager 102 may provide all, or a portion of, the computer-implemented services. For example, communication manager 102 may provide computer-implemented services to users of communication manager 102 and/or other computing devices operably connected to communication manager 102.

To facilitate performance of the computer-implemented services, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the computer-implemented services.

All, or a portion, of data processing systems 100 may provide (and/or participate in and/or support the) computer-implemented services to various computing devices operably connected to data processing systems 100. Different data processing systems may provide similar and/or different computer-implemented services.

When providing the computer-implemented services, the system of FIG. 1 may monitor use of existing methods of communication by data processing systems throughout a distributed environment.

Over time, the use of the existing method of communication may change for a data processing system of the data processing systems. For the data processing system, the existing method of communication may no longer be sufficient to meet requirements (e.g., data transmission requirements) for facilitating the computer-implemented services provided by the system.

For example, the data processing system may be associated with a data collector positioned in an ambient environment to collect temperature measurements. Over time, a data drift event may occur in the temperature measurements, and the data transmission requirements of the system may change (e.g., larger amounts of data may be required to be transmitted to monitor the data drift event, etc.). Therefore, the existing method of communication may not be able to support the increased data transmission requirements of the system. Continued use of the existing method of communication may interrupt and/or otherwise impact the quality of the computer-implemented services facilitated by the data collector.

In general, embodiments disclosed herein may provide methods, systems, and/or devices for managing methods of communication utilized by data processing systems throughout a distributed environment. To do so, the system of FIG. 1, may determine whether characteristics of an existing method of communication are sufficient to meet a communication requirement (e.g., a rate of data transmission, a quantification of latency of data transmission, a quantification of energy consumption by the data processing system, etc.).

If the characteristics of the existing method of communication are not sufficient to meet the communication requirement, the system of FIG. 1 may determine whether an update to the existing method of communication may bring the existing method of communication into compliance with the communication requirement. To do so, the system of FIG. 1 may host and operate a digital twin of the data processing system. By simulating operation of the data processing system using different methods of communication, the system of FIG. 1 may determine whether replacing the existing method of communication with an alternative method of communication may meet the communication requirement. If the alternative method of communication is identified as meeting the communication requirement, a communication channel of the data processing system may be re-allocated to the alternative method of communication.

To provide the above noted functionality, the system of FIG. 1 may include communication manager 102. Communication manager 102 may (i) identify a change (e.g., an expected/predicted change, an actual change, etc.) in use of an existing method of communication by a data processing system, (ii) obtain communication system performance data for the data processing system in response to the change in the use, and/or (iii) determine whether future use of the existing method of communication will meet a communication requirement for the data processing system. If the existing method of communication will not meet the communication requirement, communication manager 102 may (i) identify a remedial action set using a digital twin of the data processing system to identify a potential update to the existing method of communication, and/or (ii) initiate performance of the remedial action set.

Figure 2:
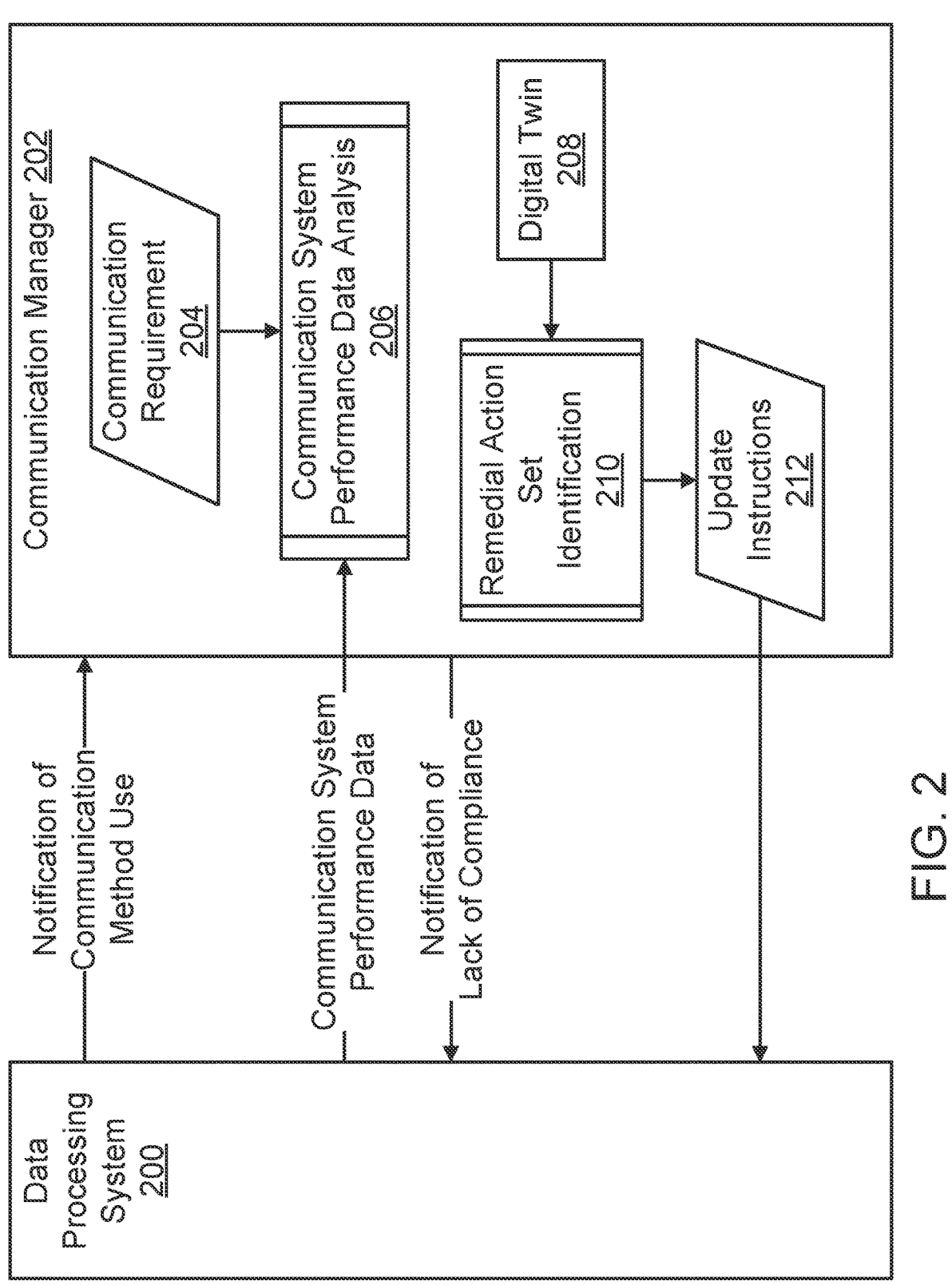
FIG. 2 shows a block diagram illustrating a communication manager monitoring a method of communication used by a data processing system in accordance with an embodiment.
Figure 3:
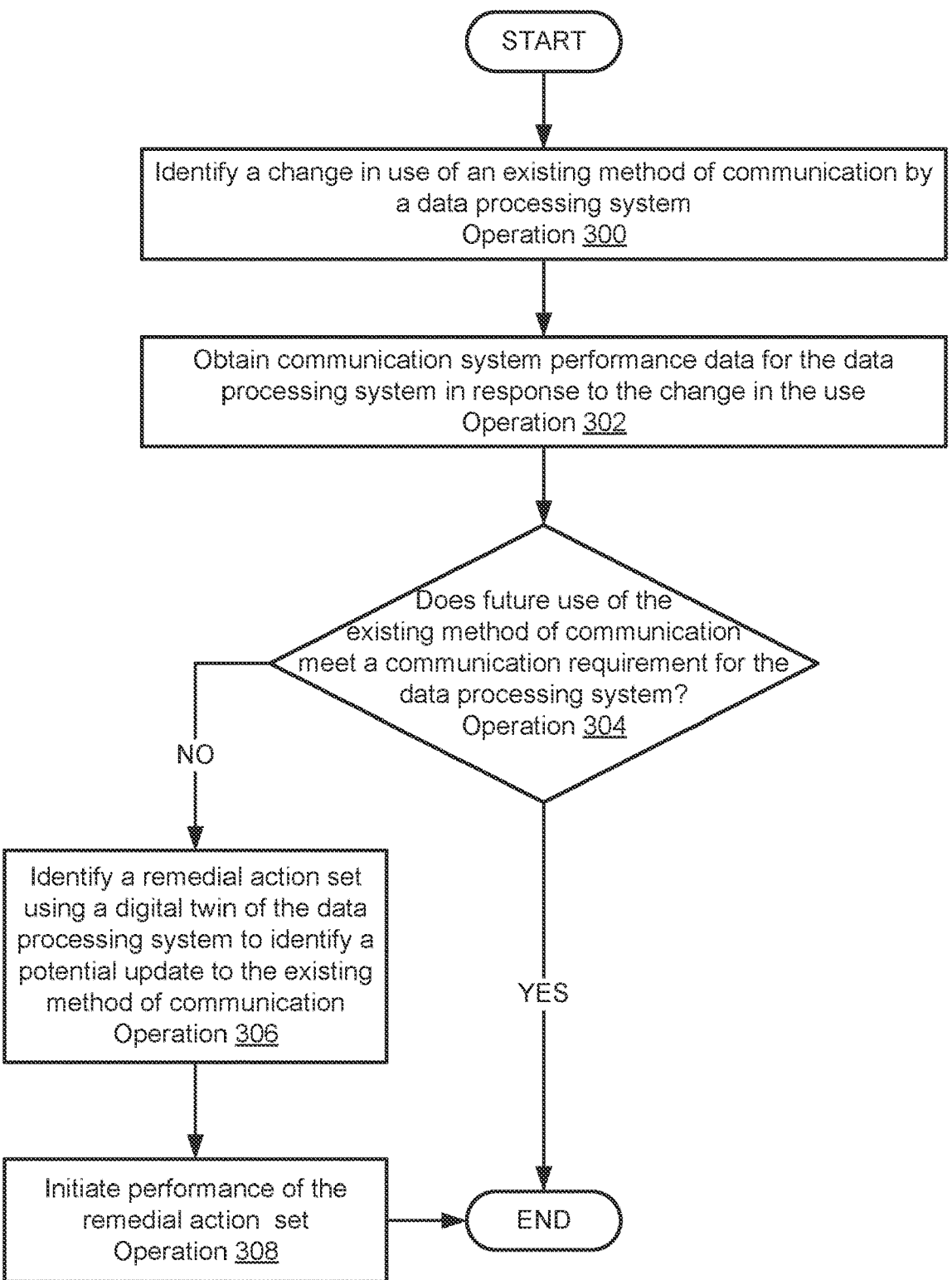
FIG. 3 shows a flow diagram illustrating a method of managing an existing method of communication utilized by a data processing system in accordance with an embodiment.

When performing its functionality, communication manager 102 and/or data processing systems 100 may perform all, or a portion, of the methods and/or actions shown in FIGS. 2-3.

Data processing systems 100 and/or communication manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data processing systems 100 and/or communication manager 102 are implemented using an internet of things (IoT) device, which may include a computing device. The IoT device may operate in accordance with a communication model and/or management model known to communication manager 102, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 101 may facilitate use of any number of methods of communication (e.g., communication schemes) usable by data processing systems 100 to send and receive communications. Each method of communication may be associated with certain characteristics related to operation and performance of communications (e.g., latency, data transmission rate, reliability, scalability, energy consumption, etc.) and each method of communication may also present tradeoffs between the characteristics (e.g., power consumption may be reduced by implementing a communication scheme with a lower rate of data transmission, etc.). Methods of communication may include: (i) long range (LoRa) communications, (ii) narrowband internet of things (NB-IoT) communications, (iii) bluetooth low energy (BLE) communications, and/or any other method of communications.

While illustrated in FIG. 1 as including a limited number of specific components, a system in accordance with an embodiment may include fewer, additional, and/or different components than those illustrated therein.

To further clarify embodiments disclosed herein, a diagram illustrating data flows and/or processes performed in a system in accordance with an embodiment are shown in FIG. 2.

FIG. 2 shows a block diagram of communication manager 202 monitoring use of an existing method of communication by data processing system 200 in accordance with an embodiment. Communication manager 202 may be similar to communication manager 102 shown in FIG. 1. In FIG. 2, communication manager 202 may be connected to data processing system 200 via a communication system (not shown). Data processing system 200 may be similar to any of data processing systems 100 shown in FIG. 1.

In FIG. 2, data processing system 200 may, for example, utilize a communication channel (not shown) to send and receive data transmissions. Different communication methods utilized by the communication channel (e.g., LoRa, NB-IoT, BLE, etc.) may have different characteristics and, therefore, may each present unique tradeoffs between the characteristics. For example, a first method of communication may allow for an increased rate of data transmission in exchange for a higher rate of energy consumption. In contrast, a second method of communication may consume a lower quantity of energy during operation in exchange for a lower rate of data transmission. The second method of communication may be preferrable if large amounts of data and/or high rates of data transmission are not required to reduce energy consumption.

Requirements for communications sent and/or received by data processing system 200 may change over time. For example, data processing system 200 may be associated with a data collector positioned to collect temperature measurements of an environment. A data drift event may occur in the temperature measurements collected by data processing system 200 and, therefore, an increased data transmission rate may be required to monitor and remediate the data drift event.

Data processing system 200 may provide communication manager 202 with a notification of communication method use. The notification of communication method use may include, for example, a regular transmission of data, statistics related to transmissions by the data processing system, and/or other data indicating how data processing system 200 uses an existing method of communication.

Continuing with the above example, data processing system 200 may provide temperature measurements to a data aggregator (not shown). It may be advantageous to reduce the volume of data transmitted over the communication system to conserve communication system bandwidth, etc. To facilitate this, the system may implement a twin inference model, the twin inference model being trained to predict temperature measurements obtained by data processing system 200.

To decrease volume of data transmitted over the communication system, data processing system 200 may generate a reduced-size representation of a temperature measurement prior to providing the temperature measurement to the data aggregator. The reduced-size representation of the temperature measurement may include, for example, a difference between the temperature measurement and a first inference generated by a first instance of the twin inference model hosted by data processing system 200, the inference being intended to match the temperature measurement.

Upon receipt of the difference, communication manager 202 may re-construct the temperature measurements using the difference and a second inference generated by a second instance of the twin inference model hosted by communication manager 202. The first inference and the second inference may be identical and, therefore, communication manager 202 may have access to the temperature measurement without being provided with all of the data associated with the temperature measurement.

During normal operation of data processing system 200, the difference may fall below a threshold, the threshold indicating an acceptable magnitude of deviation between the first inference and the temperature measurement. However, if a magnitude of the difference increases or decreases to an extent that exceeds the threshold, communication manager 202 may infer that a data drift, anomaly, and/or other event has occurred that may require further analysis and remediation by the system.

Analyzing and remediating the event may require a change to the type, quantity, frequency, etc. of transmissions provided by data processing system 200. In this example, communication manager 202 may or may not be the data aggregator. Data processing system 200 may transmit the notification of communication method use to communication manager 202 at regular intervals to allow communication manager 202 to identify any changes to the operation of data processing system 200. In this example, the notification of communication method use may include the difference.

Communication manager 202 may, for example, monitor the magnitude of the difference and if the magnitude of the difference exceeds a threshold, communication manager 202 may determine that the use of the existing method of communication has changed by data processing system 200 (not shown).

If the notification of communication method use indicates a change in the use, communication manager 202 may investigate whether continued use of the existing method of communication will be sufficient for continued performance of computer-implemented services facilitated by data processing system 200. To do so, communication manager 202 may obtain communication system performance data from data processing system 200.

The communication system performance data may include characteristics of the existing method (or methods) of communication. The characteristics of the existing method of communication may include at least one of the following: (i) a quantification of energy consumption by the data processing system, (ii) a rate of data transmission, (iii) a quantification of reliability of data transmission, (iv) a quantification of latency of data transmission, (iv) a range of data transmission, and/or other characteristics.

Communication manager 202 may perform communication system performance data analysis 206 process using the communication system performance data and communication requirement 204. Communication requirement 204 may include a criterion for a characteristic of the characteristics of the existing method of communication that delineates whether the communication requirement is met. Communication requirement 204 may include any number of criteria for any number of characteristics and the criteria may be based on the change in the use of the existing method of communication by data processing system 200.

Communication system performance data analysis 206 process may include comparing the communication system performance data to communication requirement 204 to determine if the characteristics in the communication system performance data meet the criteria included in communication requirement 204.

For example, the change in the use may be a higher reporting rate due to a data drift in the temperature measurement samples by a sensor (not shown) associated with data processing system 200. Therefore, the higher reporting rate may require a higher communication bandwidth for the existing method of communication. Consequently, an increased data transmission rate and a higher acceptable quantity of energy consumption may be included in communication requirement 204.

In FIG. 2, the characteristics included in the communication system performance data may not meet the criteria included in communication requirement 204. As a result of communication system performance data analysis 206 process, communication manager 202 may provide data processing system 200 with a notification of lack of compliance. A lack of compliance with communication requirement 204 may lead to, for example, an undesirable latency in receipt of data transmissions, interruptions to computer-implemented services facilitated by data processing system 200, and/or other undesirable impacts.

In response to determining that the existing method of communication utilized by data processing system 200 is not sufficient to meet communication requirement 204, communication manager 202 may operate digital twin 208. Digital twin 208 may include a data structure with instructions to simulate operation of data processing system 200 while performing computer-implemented services. Communication manager 202 may be able to simulate operation of data processing system 200 using different methods of communication using digital twin 208.

Therefore, communication manager 202 may perform remedial action set identification 210 process using digital twin 208 to identify a potential update to the existing method of communication, the potential update being intended to bring the existing method of communication into compliance with communication requirement 204.

Remedial action set identification 210 process may include sequentially evaluating potential updates to the existing method of communication using digital twin 208. To do so, communication manager 202 may obtain simulated communication system performance data (not shown) generated by digital twin 208 using a first potential communication method and comparing the simulated communication system performance data to the criteria included in communication requirement 204. If characteristics of the first potential communication method included in the simulated communication performance data meet the criteria, communication manager 202 may obtain update instructions 212.

Update instructions 212 may include instructions for implementing the first potential communication method. Communication manager 202 may provide update instructions 212 to data processing system 200.

In an embodiment, communication manager 202 is implemented using a processor adapted to execute computing code stored on a persistent storage that when executed by the processor performs the functionality of communication manager 202 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to manage methods of communication utilized by data processing systems throughout a distributed environment. FIG. 3 illustrates methods that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing an existing method of communication utilized by a data processing system in accordance with an embodiment is shown. The method may be performed, for example, by a communication manager, data processing system, and/or any other device.

At operation 300, a change in use of an existing method of communication by a data processing system is identified. The change in the use of the existing method of communication by the data processing system may be identified by: (i) obtaining a notification indicating that a change in the use has occurred, (ii) analyzing data obtained from the data processing system and concluding that a change in the use has occurred based on the analysis, and/or (iii) other methods.

The notification indicating that a change in the use has occurred may be obtained from the data processing system and/or another entity responsible for monitoring the use of the existing method of communication. The notification indicating that the change in the use has occurred may be obtained by: (i) receiving the notification in the form of a message transmitted across a communications system, (ii) receiving a notification in an application on a device, (iii) by reading the notification from storage, and/or via other methods without departing from embodiments disclosed herein.

Analyzing data obtained from the data processing system may include: (i) receiving data as a transmission over a communication system (and/or from storage, from a database, etc.), and/or (ii) determining whether the data indicates the change in use (e.g., the presence of data drift, the presence of anomalies in the data, etc.).

At operation 302, communication system performance data for the data processing system is obtained in response to the change in the use. The communication system performance data may be obtained by: (i) receiving the communication system performance data in the form of a message over a communication system, (ii) by accessing a database (locally or offsite) where communication system performance data is stored, (iii) by reading the communication system performance data from storage, and/or via other methods. The communication system performance data may be obtained according to a schedule indicating regular transmissions of communication system performance data (e.g., once per hour, once per day, etc.), upon request by an entity for the communication system performance data, and/or by following any other previously determined schedule.

At operation 304, it is determined whether future use of the existing method of communication meets a communication requirement for the data processing system. Determining whether future use of the existing method of communication meets the communication requirement may include: (i) obtaining criteria for characteristics of the existing method of communication using the communication requirement, and/or (ii) comparing characteristics of the existing method of communication (from the communication system performance data) to the criteria.

The criteria for the characteristics of the existing method of communication may be obtained by: (i) obtaining the communication requirement, and/or (ii) obtaining a list of characteristics included in the communication requirement.

The communication requirement may be obtained by: (i) receiving the communication requirement in the form of a message over a communication system, (ii) by accessing a database (locally or offsite) where communication requirements are stored, (iii) by reading the communication requirement from storage, and/or via other methods.

The communication requirement may include a list of characteristics and corresponding thresholds for each characteristic of the list of the characteristics. The list of the characteristics may be obtained by reading the list from storage, by requesting the list from another entity responsible for storing the communication requirement, by accessing a database including the list, and/or other methods.

The characteristics of the existing method of communication may be compared to the criteria by: (i) obtaining a first characteristic of the characteristics from the communication system performance data, (ii) identifying a corresponding threshold associated with the first characteristic from the criteria, (ii) comparing the first characteristic to the corresponding threshold to determine whether the first characteristic meets the criteria, and/or (ii) repeating the previously described steps for each additional characteristic of the characteristics.

If the future use of the existing method of communication meets the communication requirement, the method may end following operation 304. If the future use of the existing method of communication does not meet the communication requirement, the method may proceed to operation 306.

At operation 306, a remedial action set is identified using a digital twin of the data processing system to identify a potential update to the existing method of communication.

Identifying the remedial action set may include: (i) obtaining simulated communication system performance data generated by the digital twin for the potential update, (ii) comparing the simulated communication system performance data to the criteria to identify whether the potential update is likely to bring the existing method of communication into compliance with the communication requirement, and/or (iii) if the potential update is likely to bring the existing method of communication into compliance with the communication requirement, identifying the potential update for implementation.

The simulated communication system performance data may be obtained by: (i) receiving the simulated communication system performance data in the form of a message over a communication system, (ii) by accessing a database (locally or offsite) where simulated communication system performance data is stored, (iii) by reading the simulated communication system performance data from storage, and/or (iv) via other methods.

The simulated communication performance data may also be obtained by generating the simulated communication performance data using the digital twin. Generating the simulated communication system performance data may include: (i) obtaining a digital twin of the data processing system with a first alternative method of communication (the first alternative method of communication being associated with the potential update), (ii) performing a simulation of operation of the data processing system using the digital twin, and/or (iii) obtaining the simulated communication system performance data based on the simulated operation of the data processing system.

The digital twin may be obtained by: (i) reading the digital twin from storage, (ii) obtaining the digital twin from an entity responsible for generating and/or managing digital twins, (iii) by generating the digital twin (e.g., by obtaining a copy of software executed by the data processing system to perform computer-implemented services), and/or (iv) via other methods.

Performing the simulation of the operation of the data processing system may include: (i) obtaining input data for the digital twin, and/or (ii) performing computations using the digital twin and the input data to simulate operation of the data processing system.

The input data may be obtained by: (i) receiving a transmission from the data processing system including data provided by one or more sensors associated with the data processing system, (ii) reading the input data from storage, (iii) simulating the input data using an inference model (e.g., a neural network, etc.), (iv) receiving the input data from another entity throughout the distributed environment, and/or via other methods.

Performing the computations using the digital twin and the input data may include feeding the input data into the digital twin and obtaining a simulated output, the simulated output being intended to match an output generated by the data processing system. For example, the data processing system may perform anomaly detection services using temperature measurements from an environment. In this example, the input data may include the temperature measurements and the digital twin may perform anomaly detection using the temperature measurements. The simulated output may include an indication of whether any anomalies exist in the temperature measurements.

The computations may also be performed by providing the input data to another entity responsible for hosting and operating the digital twin and receiving the simulated output in response from the entity.

To obtain the simulated communication system performance data, characteristics of the first alternative method of communication may be obtained based on the operation of the digital twin. To obtain the characteristics of the first alternative method of communication, transmissions sent and received by the digital twin during operation (as well as metadata associated with the transmissions) may be obtained. Quantifications of characteristics of the first alternative method of communication (e.g., a rate of data transmission, a quantification of energy consumption, a latency in data transmissions, etc.) may be added to a data structure and the data structure may be treated as the simulated communication system performance data.

The characteristics of the simulated communication system performance data may be compared to the criteria by: (i) obtaining a first characteristic of the simulated communication system performance data corresponding to a first characteristic of the criteria, (ii) determining whether a quantification of the first characteristic of the simulated communication system performance data meets a threshold indicated by the first characteristic of the criteria, and/or (ii) repeating the previously described steps for each additional characteristic of the simulated communication system performance data.

The potential update may be identified for implementation by: (i) ending simulations by the digital twin, (ii) encapsulating the potential update in a data structure to serve as instructions for implementing the potential update, and/or other actions.

Identifying the remedial action set may also include sequentially evaluating other potential updates using the digital twin until the criteria is met.

Sequentially evaluating other potential updates may include: (i) obtaining simulated communication system performance data associated with simulated use of any number of additional methods of communication, (ii) determining whether characteristics of the use of each additional method of communication meet the communication requirement, and/or (iii) if characteristics of one of the additional methods of communication meets the communication requirement, selecting the one of the additional methods of communication for implementation.

At operation 308, performance of the remedial action set is initiated.

Initiating the performance of the remedial action set may include: (i) reallocating, based on the potential update, a first communication channel to support the change in the use, and/or (ii) reallocating, based on the potential update, a second communication channel that does not support the change in the use. The data processing system may be associated with multiple communication channels (e.g., the first communication channel, the second communication channel, and/or any additional communication channels). If one of the multiple communication channels requires an update, it may be preferable to update all of the multiple communication channels simultaneously. Therefore, the second communication channel may be updated even though the update of the second communication channel may not support the change in the use.

The first communication channel may be reallocated by: (i) providing instructions (e.g., via a message, a notification in an application on a device, etc.) to the data processing system to substitute operation of the existing method of communication by the first communication channel with a second method of communication (e.g., the first alternative method of communication listed above and/or any other method of communication that meets the criteria in the communication requirement), (ii) notifying another entity responsible for re-allocating communication channels, and/or other methods.

The second communication channel may be reallocated by: (i) providing instructions (e.g., via a message, a notification in an application on a device, etc.) to the data processing system to substitute operation of the existing method of communication by the second communication channel with the second method of communication, (ii) notifying another entity responsible for re-allocating communication channels, and/or other methods.

The performance of the remedial action set may also be initiated by deploying hardware and/or software components to the data processing system to support implementation of the first alternative method of communication, and/or other actions.

The method may end following operation 308.

Figure 4:
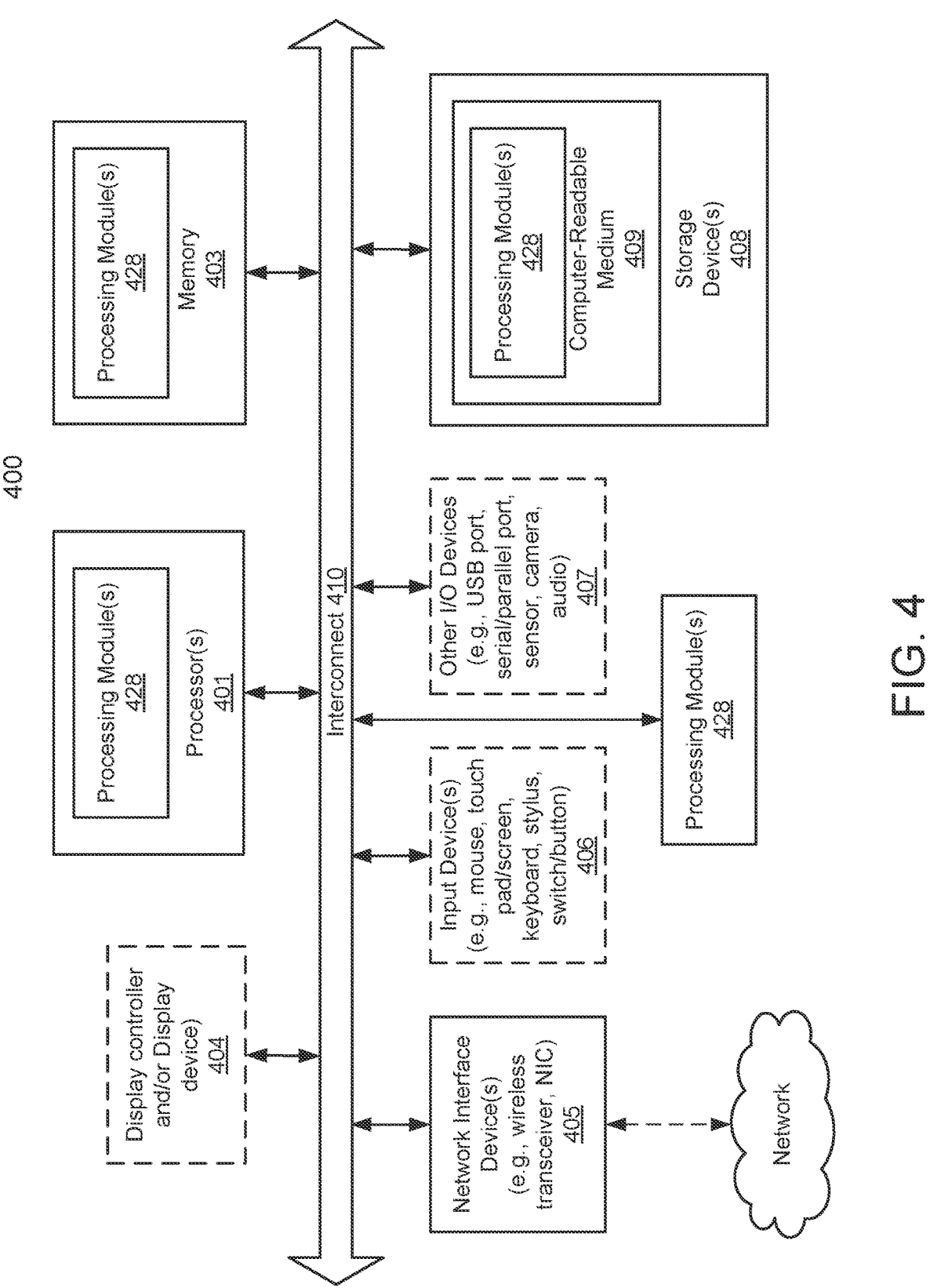
FIG. 4 shows a block diagram illustrating a data processing system in accordance with an embodiment.

Any of the components illustrated in FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network inter-face card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above.

Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing communications between data processing systems throughout a distributed environment by a communication manager, the method comprising:

identifying a change in use of an existing method of communication by a data processing system of the data processing systems;

obtaining communication system performance data for the data processing system in response to the change in the use, the communication system performance data comprising characteristics of the existing method of communication;

making a determination, based on the communication system performance data and the change in the use, regarding whether future use of the existing method of communication will meet a communication requirement for the data processing system;

in an instance of the determination in which the future use of the existing method of communication does not meet the communication requirement:

identifying a remedial action set using a digital twin of the data processing system to identify a potential update to the existing method of communication, the potential update being intended to bring the existing method of communication into compliance with the communication requirement; and initiating performance of the remedial action set.

2. The method of claim 1, wherein the characteristics of the existing method of communication comprise at least one selected from a list consisting of:

a quantification of energy consumption by the data processing system;

a rate of data transmission;

a quantification of reliability of data transmission;

a quantification of latency of data transmission; and a range of data transmission.

3. The method of claim 2, wherein the communication requirement comprises a criterion for a characteristic of the characteristics of the existing method of communication that delineates whether the communication requirement is met.

4. The method of claim 3, wherein identifying the remedial action set comprises:

obtaining simulated communication system performance data generated by the digital twin for the potential update; and comparing the simulated communication system performance data to the criterion to identify whether the potential update is likely to bring the existing method of communication into compliance with the communication requirement; and in an instance of the comparing where the potential update is likely to bring the existing method of communication into compliance with the communication requirement: identifying the potential update for implementation.

5. The method of claim 4, wherein identifying the remedial action set further comprises:

sequentially evaluating other potential updates using the digital twin until the criterion is met.

6. The method of claim 1, wherein initiating performance of the remedial action set comprises:

reallocating, based on the potential update, a first communication channel to support the change in the use; and reallocating, based on the potential update, a second communication channel that does not support the change in the use.

7. The method of claim 1, wherein the change in the use is a higher reporting rate due to a data drift in measurement samples by a sensor, the higher reporting rate requiring a higher communication bandwidth for the existing method of communication.

8. A non-transitory machine-readable medium having instructions stored therein, which when executed by a processor, cause the processor to perform operations for managing communications between data processing systems throughout a distributed environment by a communication manager, the operations comprising:

identifying a change in use of an existing method of communication by a data processing system of the data processing systems;

obtaining communication system performance data for the data processing system in response to the change in the use, the communication system performance data comprising characteristics of the existing method of communication;

making a determination, based on the communication system performance data and the change in the use, regarding whether future use of the existing method of communication will meet a communication requirement for the data processing system;

in an instance of the determination in which the future use of the existing method of communication does not meet the communication requirement:

identifying a remedial action set using a digital twin of the data processing system to identify a potential update to the existing method of communication, the potential update being intended to bring the existing method of communication into compliance with the communication requirement; and initiating performance of the remedial action set.

9. The non-transitory machine-readable medium of claim 8, wherein the characteristics of the existing method of communication comprise at least one selected from a list consisting of:

a quantification of energy consumption by the data processing system;

a rate of data transmission;

a quantification of reliability of data transmission;

a quantification of latency of data transmission; and a range of data transmission.

10. The non-transitory machine-readable medium of claim 9, wherein the communication requirement comprises a criterion for a characteristic of the characteristics of the existing method of communication that delineates whether the communication requirement is met.

11. The non-transitory machine-readable medium of claim 10, wherein identifying the remedial action set comprises:

obtaining simulated communication system performance data generated by the digital twin for the potential update; and comparing the simulated communication system performance data to the criterion to identify whether the potential update is likely to bring the existing method of communication into compliance with the communication requirement; and in an instance of the comparing where the potential update is likely to bring the existing method of communication into compliance with the communication requirement: identifying the potential update for implementation.

12. The non-transitory machine-readable medium of claim 11, wherein identifying the remedial action set further comprises:

sequentially evaluating other potential updates using the digital twin until the criterion is met.

13. The non-transitory machine-readable medium of claim 8, wherein initiating performance of the remedial action set comprises:

reallocating, based on the potential update, a first communication channel to support the change in the use; and reallocating, based on the potential update, a second communication channel that does not support the change in the use.

14. The non-transitory machine-readable medium of claim 8, wherein the change in the use is a higher reporting rate due to a data drift in measurement samples by a sensor, the higher reporting rate requiring a higher communication bandwidth for the existing method of communication.

15. A data processing system, comprising:

a processor; and a memory coupled to the processor to store instructions, which when executed by the processor, cause the processor to perform operations for managing communications between data processing systems throughout a distributed environment by a communication manager, the operations comprising:

identifying a change in use of an existing method of communication by a data processing system of the data processing systems;

obtaining communication system performance data for the data processing system in response to the change in the use, the communication system performance data comprising characteristics of the existing method of communication;

making a determination, based on the communication system performance data and the change in the use, regarding whether future use of the existing method of communication will meet a communication requirement for the data processing system;

in an instance of the determination in which the future use of the existing method of communication does not meet the communication requirement:

identifying a remedial action set using a digital twin of the data processing system to identify a potential update to the existing method of communication, the potential update being intended to bring the existing method of communication into compliance with the communication requirement; and initiating performance of the remedial action set.

16. The data processing system of claim 15, wherein the characteristics of the existing method of communication comprise at least one selected from a list consisting of:

a quantification of energy consumption by the data processing system;

a rate of data transmission;

a quantification of reliability of data transmission;

a quantification of latency of data transmission; and a range of data transmission.

17. The data processing system of claim 16, wherein the communication requirement comprises a criterion for a characteristic of the characteristics of the existing method of communication that delineates whether the communication requirement is met.

18. The data processing system of claim 17, wherein identifying the remedial action set comprises:

obtaining simulated communication system performance data generated by the digital twin for the potential update;

comparing the simulated communication system performance data to the criterion to identify whether the potential update is likely to bring the existing method of communication into compliance with the communication requirement; and in an instance of the comparing where the potential update is likely to bring the existing method of communication into compliance with the communication requirement:

identifying the potential update for implementation.

19. The data processing system of claim 18, wherein identifying the remedial action set further comprises:

sequentially evaluating other potential updates using the digital twin until the criterion is met.

20. The data processing system of claim 15, wherein initiating performance of the remedial action set comprises:

reallocating, based on the potential update, a first communication channel to support the change in the use; and reallocating, based on the potential update, a second communication channel that does not support the change in the use.

\* \* \* \* \*